(12) United States Patent
Henry et al.

(10) Patent No.: US 10,813,013 B1
(45) Date of Patent: Oct. 20, 2020

(54) LOCATION-ASSISTED INTER-SET ROAMING

(71) Applicant: Cisco Technology, Inc., San Jose, CA (US)

(72) Inventors: Jerome Henry, Pittsboro, NC (US); Jagdish Girimaji, Pleasanton, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/552,501

(22) Filed: Aug. 27, 2019

(51) Int. Cl.
    *H04W 36/00*     (2009.01)
    *H04W 36/14*     (2009.01)
    *H04W 64/00*     (2009.01)

(52) U.S. Cl.
    CPC ... *H04W 36/0061* (2013.01); *H04W 36/0058* (2018.08); *H04W 36/14* (2013.01); *H04W 64/006* (2013.01)

(58) Field of Classification Search
    None
    See application file for complete search history.

(56) References Cited

U.S. PATENT DOCUMENTS

| | | | | |
|---|---|---|---|---|
| 2005/0090259 A1* | 4/2005 | Jain | ................ | H04L 29/06 455/439 |
| 2006/0227744 A1* | 10/2006 | Metke | ................ | H04W 36/32 370/331 |
| 2007/0258393 A1* | 11/2007 | Cam-Winget | ....... | H04B 17/318 370/310 |
| 2014/0098682 A1* | 4/2014 | Cao | ................ | H04W 36/00835 370/252 |
| 2015/0189556 A1* | 7/2015 | Sidhu | ................ | H04W 36/14 455/436 |
| 2016/0014648 A1* | 1/2016 | Hamilton | ......... | H04W 36/0083 455/436 |
| 2016/0112942 A1* | 4/2016 | Chang | ................ | H04W 16/28 455/434 |

(Continued)

OTHER PUBLICATIONS www.wi-fi.org, "Discover Wi-Fi Wi-Fi Agile Multiband," 4 pages [Accessed Online Aug. 26, 2019—https://www.wi-fi.org/discover-wi-fi/wi-fi-agile-multiband].

(Continued)

*Primary Examiner* — German Viana Di Prisco
(74) *Attorney, Agent, or Firm* — Patterson + Sheridan, LLP (57) ABSTRACT

Steering for location-assisted inter-set roaming, between different networks of the same or different types is provided by: identifying a first station connected to a first wireless network in an environment; identifying a direction of travel of the first station; identifying a second wireless network and a third wireless network as candidate roaming targets, based on the second wireless network and the third wireless network neighboring the first wireless network in the direction of travel, wherein the second wireless network and the third wireless network are different from the first wireless network; modifying a neighbor list for the first station to include an Access Point (AP) included in the third wireless network based on environmental knowledge; removing APs included in the second wireless network based on the environmental knowledge; and transmitting the neighbor list to the first station.

20 Claims, 7 Drawing Sheets

(56) References Cited

U.S. PATENT DOCUMENTS

2018/0288664 A1* 10/2018 Ouzieli ................ H04W 36/08

OTHER PUBLICATIONS

IEEE 802.11u-2011—IEEE Standard for Information Technology-Telecommunications and information exchange between systems—Local and Metropolitan networks-specific requirements—Part II:Wireless LAN Medium Access Control (MAC) and Physical Layer (PHY)specifications: Amendment 9: Interworking with External Networks [Accessed Online Aug. 26, 2018] 43 pages.

* cited by examiner

LOCATION-ASSISTED INTER-SET ROAMING

TECHNICAL FIELD

Embodiments presented in this disclosure generally relate to handling roaming devices in an Extended Service Set (ESS). More specifically, embodiments disclosed herein relate to handling station handoff and retention in an ESS having various Radio Access Technology (RAT) types with learned locational characteristics.

BACKGROUND

When a mobile device has access to more than one Access Point (AP), user preferences, software settings, network congestion, and other factors may be used to identify which AP will provide communication services with the device. As the mobile device moves in the environment, the mobile device (or the AP) may determine that a connection between a device and a first AP should transition to a connection with a different AP and the device. The determination of whether to transition to a new AP is based on the current connection characteristics, such as, for example, the mobile device identifying a second AP has a stronger or less lossy signal than a first AP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for location-assisted inter-set roaming, the method including: identifying a first station connected to a first wireless network in an environment; identifying a direction of travel of the first station; identifying a second wireless network and a third wireless network as candidate roaming targets, based on the second wireless network and the third wireless network neighboring the first wireless network in the direction of travel, wherein the second wireless network and the third wireless network are different from the first wireless network; modifying a neighbor list for the first station to include an Access Point (AP) included in the third wireless network based on environmental knowledge; removing APs included in the second wireless network based on the environmental knowledge; and transmitting the neighbor list to the first station.

One embodiment presented in this disclosure provides a system for location-assisted inter-set roaming, the system including: a processor; and a memory including instructions that when executed by the processor enable the system to perform an operation comprising: identifying a first station connected to a first wireless network in an environment; identifying a direction of travel of the first station; identifying a second wireless network and a third wireless network as candidate roaming targets, based on the second wireless network and the third wireless network neighboring the first wireless network in the direction of travel, wherein the second wireless network and the third wireless network are different from the first wireless network; modifying a neighbor list for the first station to include an Access Point (AP) included in the third wireless network based on environmental knowledge; removing APs included in the second wireless network based on the environmental knowledge; and transmitting the neighbor list to the first station.

One embodiment presented in this disclosure provides computer readable storage device including instructions that when executed by a processor enable a computing device to perform an operation that includes: identifying a first station connected to a first wireless network in an environment; identifying a direction of travel of the first station; identifying a second wireless network and a third wireless network as candidate roaming targets, based on the second wireless network and the third wireless network neighboring the first wireless network in the direction of travel, wherein the second wireless network and the third wireless network are different from the first wireless network; modifying a neighbor list for the first station to include an Access Point (AP) included in the third wireless network based on environmental knowledge; removing APs included in the second wireless network based on the environmental knowledge; and transmitting the neighbor list to the first station.

EXAMPLE EMBODIMENTS

The present disclosure provides for location-assisted inter-set roaming to expand the capabilities of an Extended Service Set (ESS), improve the reliability of the involved networks, and enhance the ability of individual mobile devices to select the most appropriate network or Access Point (AP) for the use case of the mobile device. When determining to transition from a first AP to a second AP to provide communication services for a mobile device is based off of the perspective of the mobile device, that mobile device may make suboptimal determinations based on current conditions. For example, a mobile device may cling to a network with "good enough" signaling characteristics when a better network is available, hand-off prematurely to a new network and cause unnecessary service disruptions, avoid associating with a busy network despite no other networks being available, or associate with a lightly loaded network and waste networking resources. Therefore, a coordination controller is provided to collect and distribute information about network availability at a site to allow devices to better self-arbitrate whether to remain connected to a current network or roam to a new network.

The coordination controller provides specific coverage predictions based on time of day, the device type, current location, and observed motion of the device. Specifically, the coordination controller provides indications of neighboring networks that are available based on the current and/or future predicted position of the device itself, but also the device type/model (e.g., hardware form factor), and contextual information such as current network load and time of day. The coordination controller may observe networks provided by several different Radio Access Technologies (RAT), such as, for example, neighboring ESS WIFI® networks (e.g., according to the Institute of Electrical and Electronics Engineers (IEEE) 802.11 family of networking standards), HESS (Homogenous ESS) WiFi networks with several APs belonging to one network, and Long Term Evolution (LTE) (e.g., "cellular") networks. In various embodiments, the coordination controller provides a real-time and predictive multi-technology network heatmap, which allows the APs to steer a device to the best available network based on the device location and movement. Steering includes removing currently associated and potential future associated networks from the list maintained by the device (e.g., via 802.11k) and adding candidate networks to the list (e.g., via 802.11v) that the device may not (at present) be able to detect by itself.

As devices are connected to the APs at a site, and move about the site, the devices report observed network characteristics back to the coordination controller. The coordination controller, in turn, develops an understanding of the environment and the networking conditions at particular locations in the environment, which are used to steer devices to particular networking choices as those devices move about the environment.

Figure 1:
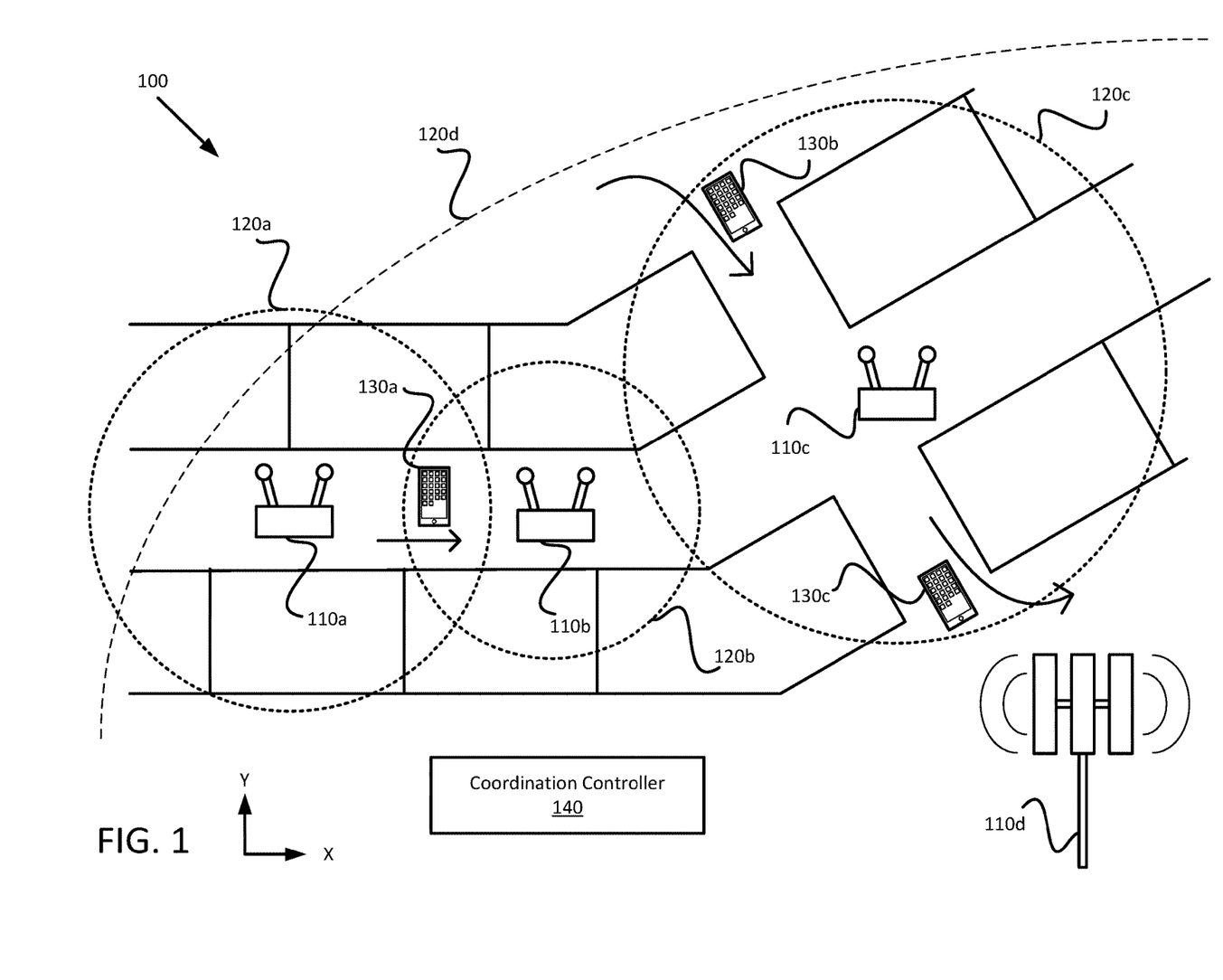
FIG. 1 illustrates an example networking environment, according to embodiments of the present disclosure.

FIG. 1 illustrates an example networking environment 100, according to embodiments of the present disclosure. In the networking environment 100, four APs 110a-d (generally, AP 110) provide four corresponding wireless networks 120a-d (generally, network 120). Several mobile devices, referred to herein as stations 130a-c (generally, station 130), are shown moving through the network environment 100, and may transition from one network 120 to another network 120 as the stations 130 move within or out of range of a given network 120.

The APs 110 may include various networking devices configured to provide wireless networks 120 according to various networking standards or RATs (e.g., IEEE 802.11 or "WiFi" networks, LTE or "cellular" networks, BLUETOOTH® networks, 5$^{th}$ Generation New Radio "5G NR" networks, Citizens Broadband Radio Service CBRS" networks, proprietary networks). Example hardware as may be included in an AP 110 is discussed in greater detail in regard to FIG. 7. The networks 120 are illustrated according to a range in the environment 100 in which a signal strength, Signal to Noise Ratio (SNR), or other network metric satisfies a predefined threshold. The APs 110 offer the various stations 130 within the range of the associated network 120 network connectivity for various services including voice communication (e.g., telephony services), text communication (e.g., paging functionality, short message service (SMS), multimedia message service (MMS)), and data transmission (e.g., wireless internet access).

Various networks 120 are illustrated in FIG. 1 as neighboring one another. As used herein, networks 120 are considered to neighbor one another when at least a portion of the range of one network 120 borders or overlaps the range of the other network 120. For example, the fourth network 120d is illustrated as a neighbor of the first through third networks 120a-c, and the second network 120b neighbors the first network 120a and the third network 120c, but the first network 120a does not neighbor the third network 120c. The range of a given network 120 may vary from the range of other networks 120 in the environment 100 based on various characteristics of the associated AP 110, including an antenna configuration, a number of antennas, a broadcast power, obstructions in the environment, the proximity to other APs 110 or signal sources, a number of stations 130 connected thereto, etc.

Each of the networks 120 may be provided by different entities, and are not necessarily in communication with one another. For example, the fourth AP 110d may be a cellular tower operated by a cellular telecommunications company, and the first through third APs 110a-c may be offered by different businesses in a retail space, different persons in an apartment complex, or by a municipality offering wireless access throughout a district, as well as other deployment scenarios. Accordingly, a given station 130 may be within range of a given network 120, but may have full, reduced, or no access to that given network 120. The present disclosure therefore refers to neighboring networks 120 that a given station 130 is permitted to access (which may also be referred to as privileged networks 120) unless specifically noted otherwise.

The stations 130 may include any computing device that is configured to wirelessly connect to one or more networks 120 in the environment 100. Example stations 130 include, but are not limited to: smart phones, feature phones, tablet computers, laptop computers, desktop computers, Internet of Things (IoT) devices, and the like. Example hardware as may be included in a station 130 is discussed in greater detail in regard to FIG. 7.

A coordination controller 140 is in communication with at least one AP 110 in the environment. In some embodiments, the coordination controller 140 is included in one AP 110 as a software package for providing network control according to the present disclosure. In other embodiments, the coordination controller 140 is provided by a separate computing device that may be local to the environment 100 or provided remotely (e.g., as a cloud-based service). The coordination controller 140 receives network fingerprints from the stations 130 in the environment 100 (via the APs 110) that specify various network characteristics as experienced by a given station 130 at a particular time and location in the environment 100, which include, but are not limited to: signal strengths of the various networks 120 visible (accessible or not) to the station 130, SNRs, uplink/downlink speeds provided, public/private status of offered networks 120, device characteristics affecting network connectivity, etc. The coordination controller 140 also receives network provisioning conditions from the connected APs 110 at various times and locations, which include, but are not limited to: a location of the AP 110 in the environment 100, a number of stations 130 connected to the AP 110, a connectivity type for the connected stations 130, signal strength from the station 130, SNR, etc.

The coordination controller 140 uses the collected data of networking conditions from the perspectives of the APs 110 and the stations 130 to develop environmental knowledge of the changing networking conditions over a time and space throughout the environment 100. For example, the coordination controller 140 may develop heatmaps for signal availability for several networks 120 in the environment at different times of day, days of the week, etc. from the reported networking conditions. Using the environmental knowledge, the coordination controller 140 steers individual stations 130 to connect to particular APs 110 by adding, removing, or prioritizing the contents of the neighbor lists maintained by the stations 130. The coordination controller 140 creates and modifies neighbor lists that the AP 110 connected with the station 130 sends to the station 130 to use when navigating the environment 100. The stations 130 use the neighbor list to direct handoffs to a new AP 110 from the current AP 110, thus allowing the station 130 to arbitrate whether the best decision is to stay connected to a current AP 110 or to roam to a new AP 110 based on broader knowledge of the environment 100 than can be directly sensed by the station 130.

Figure 2:
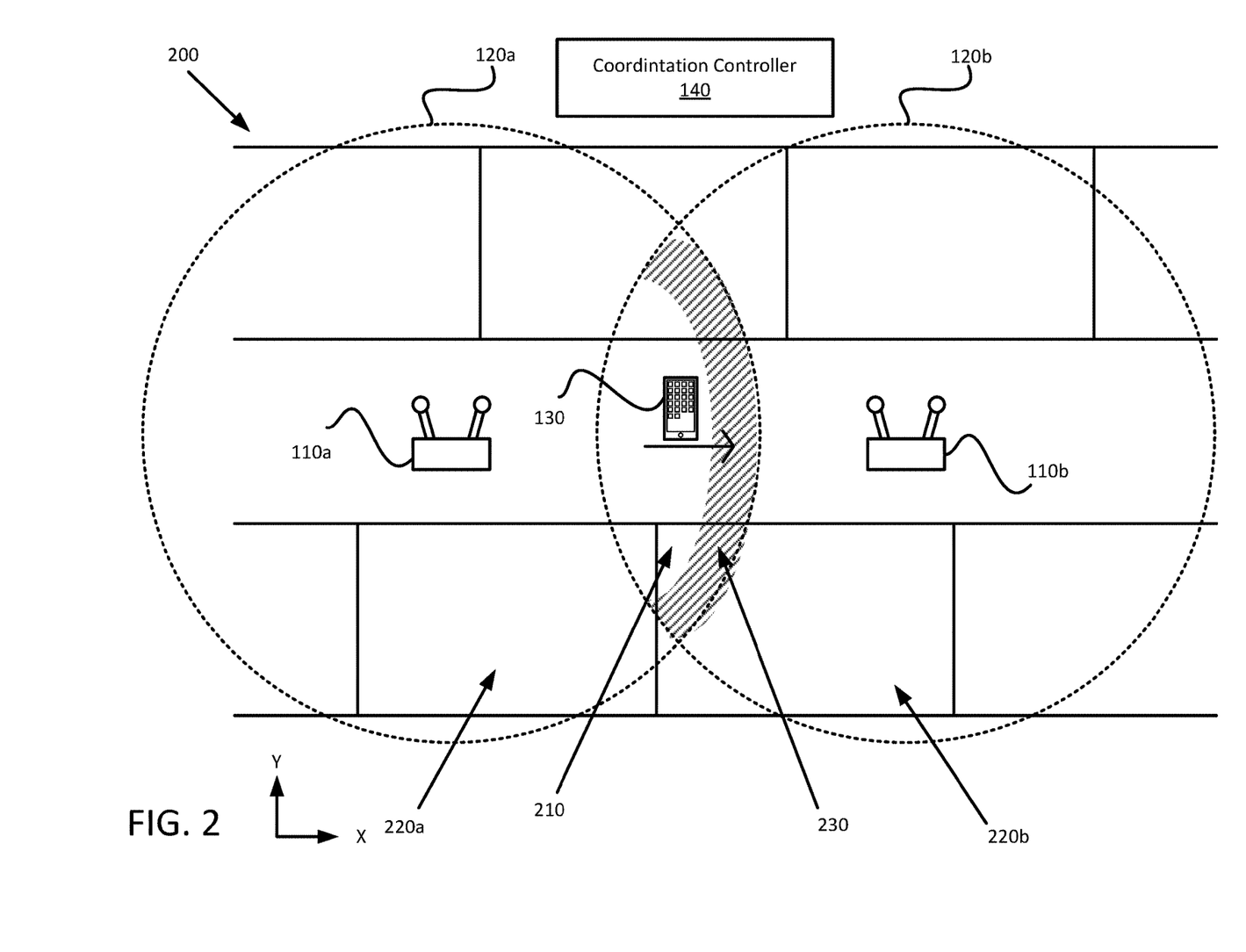
FIG. 2 illustrates a handoff scenario, according to embodiments of the present disclosure.

FIG. 2 illustrates a handoff scenario 200, according to embodiments of the present disclosure. In the handoff scenario 200, a station 130 is moving from the range of a first network 120a provided by a first AP 110a towards a second network 120b provided by a second AP 110b. The range of first network 120a partially overlaps the range of the second network 120b, resulting in an overlapped zone 210 between the two networks 110 as well as respective first and second exclusive zones 220a-b (generally, exclusive zone 220).

To affect a smooth handoff from the first network 120a to the second network 120b, the station 130 should initiate handoff when in the overlapped zone 210—attempting to handoff while in an exclusive zone 220 may result in dropped communications. A station 130 can identify overlapped zones 210 based on being able to receive two or more network identifiers at the same location. In some instances, a station 130 in an overlapped zone 210 may determine to initialize a handoff based on decreasing signal strength from the first network 120a in conjunction with increasing signal strength from the second network 120b. The station 130, however, can also determine to not initialize a handoff when in an overlapped zone 210, for example, if the station 130 is currently engaged in communications via the first network 120a, the station 130 is stationary in the overlapped zone 210 (or headed away from the second network 120b), or the first network 120a is determined to provide better service than the second network 120b.

The coordination controller 140 therefore identifies a transition zone 230 in the overlapped zone 210 for handoff from a first network 120a to a second network 120b. A transition zone 230 defines a sub-region of the overlapped zone 210 that describes a series of locations in the environment that, when the station 130 enters the transitions zone 230 in a particular direction of travel, the station 130 should transition from the current network 120 to the neighboring network 120. The coordination controller 140 may identify two or more transition zones 230 for each pair of neighboring networks 120, and the transition zone 230 for transitioning from a first network 120a to a second network 120b may describe different locations than a transition zone 230 for transitioning from the second network 120b to the first network 120a. The size and shape of the transition zone 130 is based on signaling characteristics collected by the coordination controller 140 over time from various stations 130.

Additionally, because the coordination controller 140 has collected previous operational data from the environment, the coordination controller 140 may size and shape the transition zone 230 to prevent a station 130 from connecting to a network 120 when headed into a coverage hole for that network 120. For example, due to signal reflections, interfering signal sources, irregular borders for a network 120, etc., a station 130 may detect a particular network 120 before reliably being located in the coverage area for that particular network 120. Therefore, the coordination controller 140 positions the transition zone 230 to avoid coverage holes in the destination network 120 in the overlapped zone 210 and to accommodate the capabilities of the station 130 (e.g., a smart phone with WiFi and LTE capabilities versus a tablet with WiFi capabilities and without LTE capabilities).

The station 130 may receive locational information by network location services, Global Positioning System (GPS) coordinates or the like to identify when the station 130 has entered the transition zone 230 and the speed and direction in which the station 130 is traveling. For example, a station 130 located in the overlapped zone 210 may be moving at a speed or direction that will not move the station 130 out of the overlapped zone 210 within a predefined amount of time, and the station 130 may remain connected to the first network 120 for at least the predefined amount of time.

Figure 3:
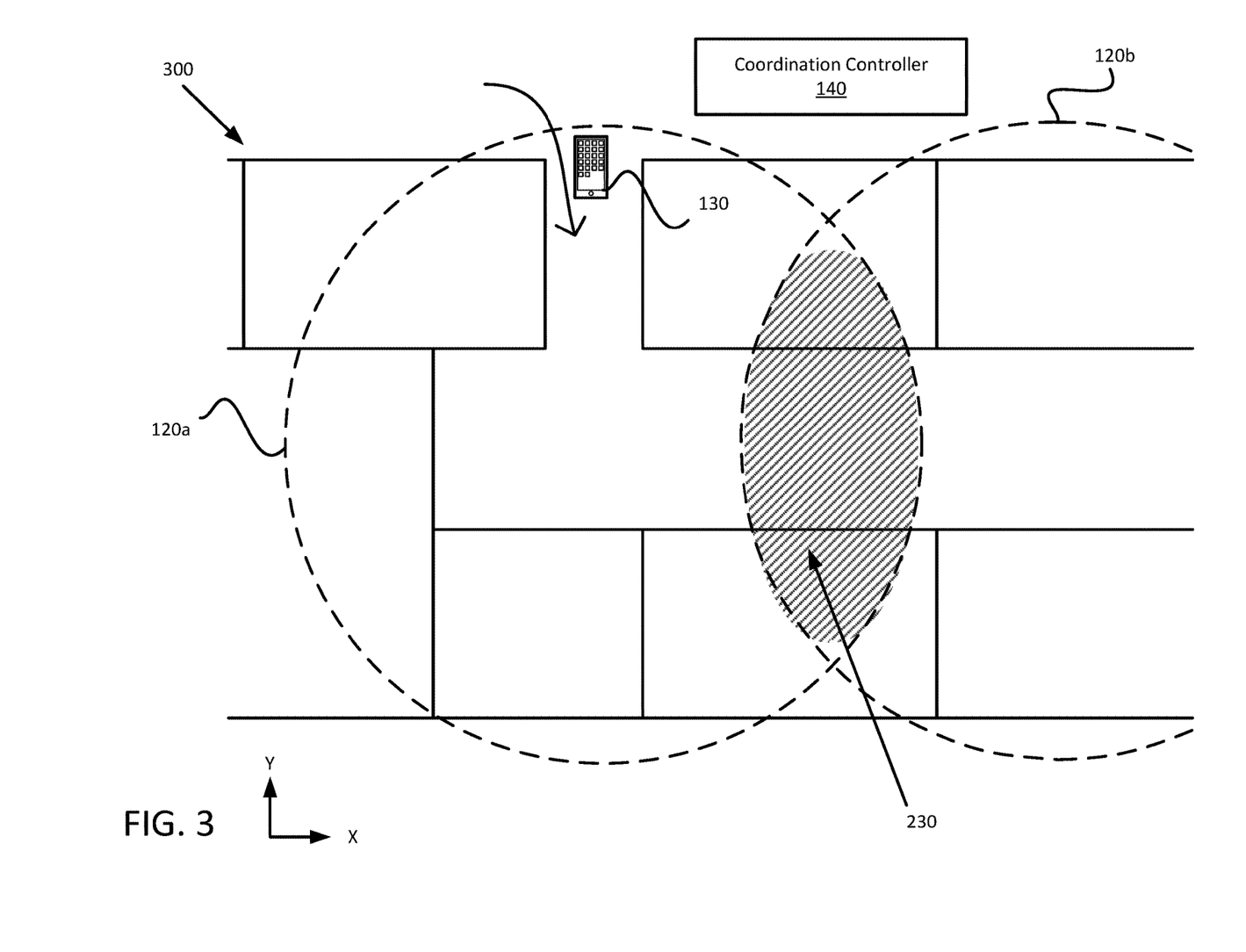
FIG. 3 illustrates a first steering scenario for handoff, according to embodiments of the present disclosure.

FIG. 3 illustrates a first steering scenario 300 for handoff, according to embodiments of the present disclosure. In the first steering scenario 300, the station 130 is moving into the coverage area of a first network 120a in an environment 100 that includes a second network 120b in an available direction of travel for the station 130. The coordination controller 140 may steer the station to connect to the second network 120b (rather than drop connectivity or connect to an exterior network) by including the broadcast identity of the second network 120b on a neighbor list for the station 130 before the station 130 in range to detect the second network 120b.

Based on environmental knowledge collected from other stations 130 previously moving through the environment 100, the coordination controller 140 can adjust the transition zone 230 to occupy all or a larger portion of the overlap zone 210 between the first and second networks 120a-b. For example, the coordination controller 140 may enlarge the transition zone 230 when the second network 120b is known to be a handoff target from the first network 120a so that the station 130 attempts to connect to the second network 120b as early as possible. By including the identity of the second network 120b on the neighbor list of the station 130 before the station 130 can detect the second network 120b, the station 130 can be prepared to transition to the second network 120b sooner and more quickly than waiting to detect the second network 120b.

In some embodiments, the coordination controller 140 may pre-load non-neighboring networks into the neighbor list for the station 130. For example, the coordination controller 140 may preload a third network 120c (not shown) that neighbors the second network 120b, but not the first network 120a, to the neighbor list when the station 130 connects to the first network 120.

Additionally, in environments with inconsistently available networks 120 (e.g., a network 120 active/available only during certain hours of the day) or networks 120 that are hidden or otherwise do not broadcast a network identifier, the neighbor list may indicate times at which a network 120 included in the neighbor list, but not currently detectable by the station 130, is expected to be available for connecting to.

Figure 4:
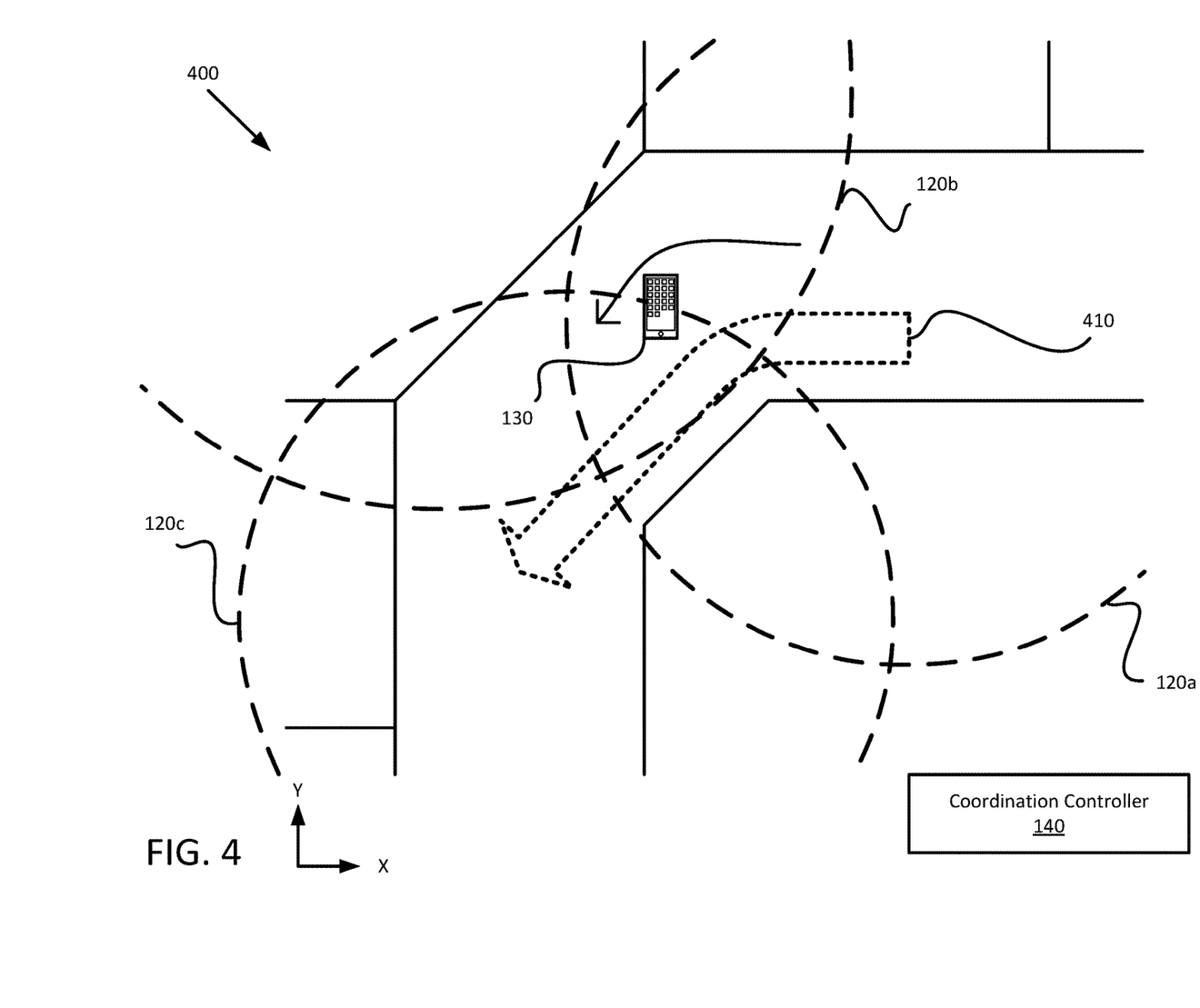
FIG. 4 illustrates a second steering scenario for handoff, according to embodiments of the present disclosure.

FIG. 4 illustrates a second steering scenario 400 for handoff, according to embodiments of the present disclosure. In the second steering scenario 400, the station 130 is moving out of the coverage area of the first network 120a, and moving into the coverage areas for both a second network 120b and a third network 120c. However, in various environments 100, observed pathway 410 may dictate which networks 120 a station 130 will enter. Accordingly, the coordination controller 140 manages the neighbor list to remove certain networks 120 as candidate handoff destinations, to thereby reduce the number of extraneous handoffs.

For example, a station 130 leaving the coverage area of a first network 120a as in FIG. 4, may be able to connect to either a second network 120b or a third network 120c to maintain a wireless connection. The coordination controller 140, based on pathway information 410 from previously reported locations for stations 130, may determine that the station 130 is likely to pass through the coverage area of the second network 120b and into the coverage area of the third network 120c before leaving the coverage area of the first network 120a. Accordingly, if the station 130 were to connect to the third network 120c, the station 130 would need to request one handoff (i.e., from the first network 120a to the third network 120c), but if the station 130 were to connect to the second network 120b, the station 130 would need to request two handoffs (i.e., from first to second networks 120a-b, and second to third networks 120b-c). Therefore, the coordination controller 140 may remove the second network 120b from the neighbor list of the station 130 to prevent the station 130 from connecting to the second network 120b and subsequently to the third network 120c, and instead steer the station 130 to only connect to the third network 120c.

The coordination controller 140 can determine which networks 120 to retain and which to remove from the neighbor list by identifying which networks 120 have a greater coverage area an which have smaller coverage areas in the predicted direction of travel of the station 130. In various embodiments, the coordination controller 140 determines which networks 120 to include or remove from the neighbor list by extrapolating a predicted path of the station 130 in the environment 100 from the current direction and speed of travel of the station 130 and the historical pathway 410 of other stations 130 in the environment 100.

The coordination controller 140 may periodically update the contents of the neighbor list for various stations 130. For example, if the station 130 in FIG. 4 changes direction to head away from the third network 120c, the coordination controller 140 may add the second network 120b back to the neighbor list, and remove the third network 120c from the neighbor list.

Figure 5:
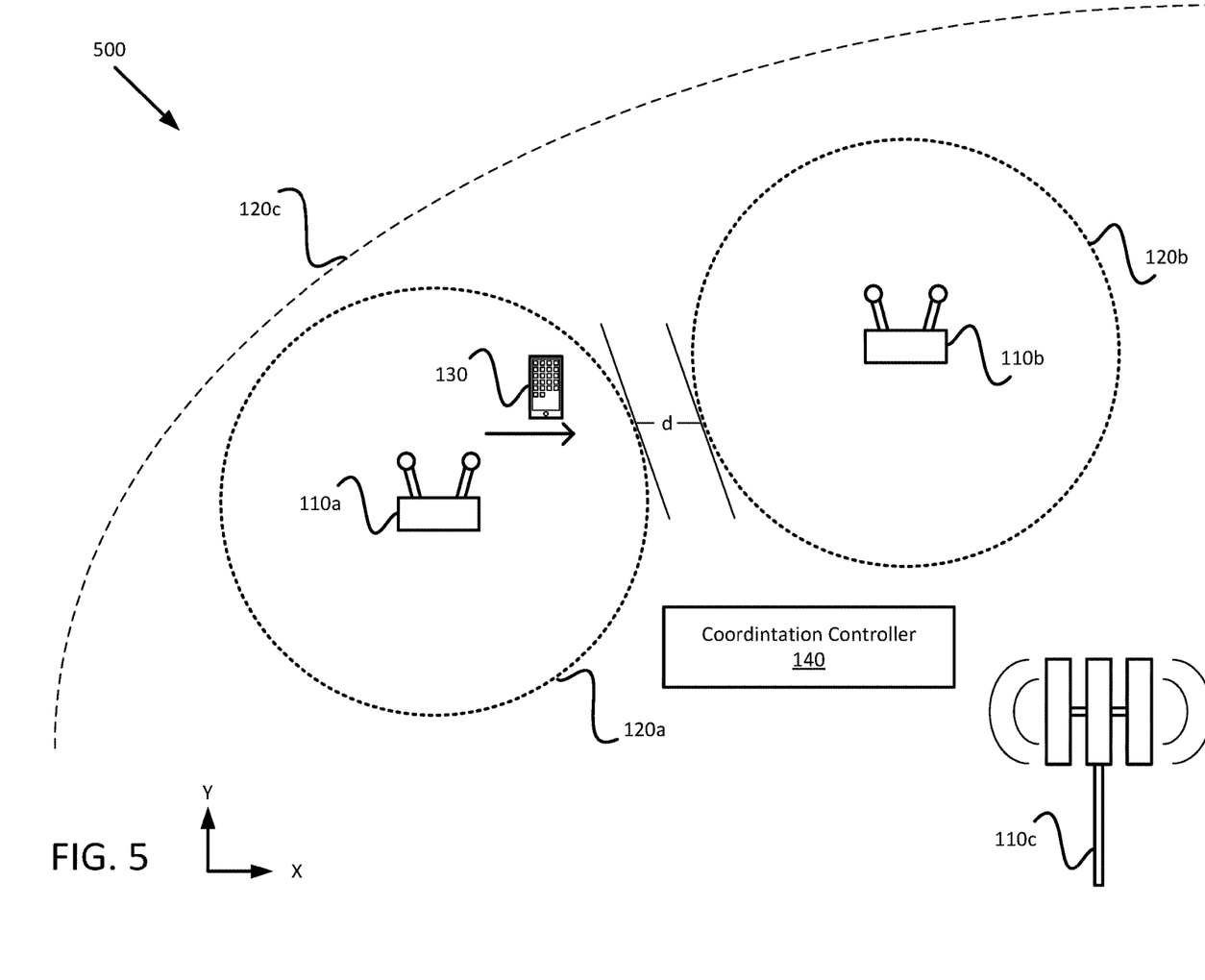
FIG. 5 illustrates a third steering scenario for handoff, according to embodiments of the present disclosure.

FIG. 5 illustrates a third steering scenario 500 for handoff, according to embodiments of the present disclosure. In the third steering scenario 500, the station 130 is moving out of the coverage area of the first network 120a and moving towards the coverage area of a second network 120b that does not neighbor the first network 120a. Both the first network 120a and the second network 120b are provided by respective APs 110a-b of a first RAT type (e.g., a WiFi network), and neighbor an encompassing third network 120c provided by a third AP 110c of a second RAT type (e.g., an LTE network).

Depending on the distance d between the first network 120a and the second network 120b, the speed at which the station 130 is moving from the first network 120a towards the second network 120b, and the settings of the station 130 related to continuous communication services, the coordination controller 140 may steer the station 130 to temporarily lose communications (e.g., to wait to connect to the second network 120b) or to switch RAT types to maintain communications.

For example, for a station 130 not currently engaged in real-time communications, that is idle, or otherwise allows service disruptions, the coordination controller 140 can remove the third network 120c from the neighbor list of the station 130 to prevent the station 130 from connecting to a non-preferred RAT type of network 120 and/or to avoid multiple handoffs within a predefined period of time when the station 130 is expected to enter the coverage area of the second network 120b within a threshold amount of time after leaving the coverage area of the first network 120a. Accordingly, when the station 130 leaves the coverage area of the first network 120a, the station 130 experiences a service disruption that is acceptable (or not noticeable) to an end user, and is prepared to re-establish service by connecting with the second network 120b. To steer the station 130 accordingly, the coordination controller 140 removes or excludes the third network 120c from the neighbor list and includes or adds the second network 120b to the neighbor list of the station 130 despite the neighboring statuses of the second and third networks 120b-c relative to the first network 120a.

In another example, when the station 130 is expected to take more than a threshold amount of time after leaving the coverage area of the first network 120a to enter the coverage area of the second network 120b, the coordination controller 140 may include the third network 120c on the neighbor list for the station 130 and exclude or remove the second network 120b from the neighbor list. Accordingly, when the station 130 leaves the coverage area of the first network 120a, the station 130 requests handoff to the third network 120c and remains connected to the third network 120c even when in the coverage area of the second network 120b; avoiding multiple handoffs. To steer the station 130 accordingly, the coordination controller 140 adds or includes the third network 120c to the neighbor list and excludes or removes the second network 120b from the neighbor list of the station 130 despite the ability of the station 130 to detect the second and third networks 120b-c at various times.

Figure 6:
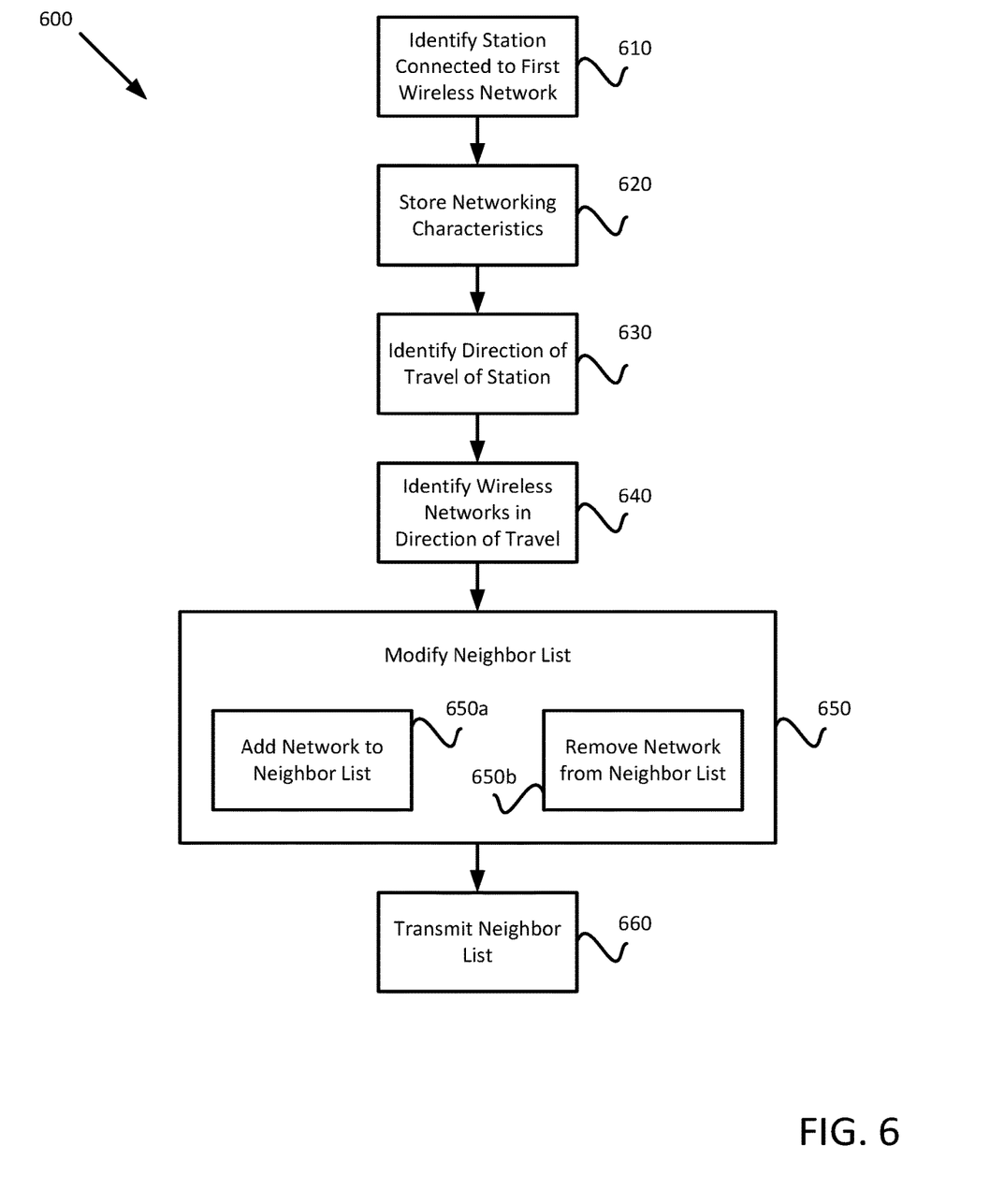
FIG. 6 is a flowchart of a method of location-assisted inter-set roaming, according to embodiments of the present disclosure.

FIG. 6 is a flowchart of a method 600 of location-assisted inter-set roaming, according to embodiments of the present disclosure. Method 600 begins at block 610, where the coordination controller 140 identifies a station 130 connected to a first wireless network 120a. The station 130 may be one of a plurality of stations 130 connected to one of a plurality of wireless networks 120 monitored by the coordination controller 140, which the coordination controller 140 steers in parallel to various handoff targets.

At block 620, the coordination controller 140, via the associated first AP 110a for the first network 120a, receives and stores networking characteristics as observed by the station 130 and the AP first 110a (and the plurality of other stations 130 and/or APs 110 monitored by the coordination controller 140). These networking characteristics are associated with the time of reporting and location of the device reporting so that the coordination controller 140 can correlate the networking and signal characteristics of the environment into a heatmap or other dataset to identify network availability throughout the environment 100. The heatmap provides environmental knowledge that enables the coordination controller 140 to identify transition regions between neighboring wireless networks 120 in the environment 100 based on the network availability and capacities at various times and locations. In various embodiments, the coordination controller 140 may modify the heatmap based on device characteristics for a given station 130 (e.g., only using data reported by devices with similar capabilities to the given station 130).

At block 630, the coordination controller 140 identifies a direction of travel of the station 130. The station 130 reports the location of the station 130 in addition to the network characteristics (per block 610), which the coordination controller 140 plots over time to identify a direction and speed of travel of the station 130. As environments 100 are often designed to direct the movement of user in predefined paths, the coordination controller 140 identifies various pathways 410 historically taken by stations 130 over time, which the coordination controller 140 uses to predict a future location of the station 130 based on the current location, direction and speed of travel, and most popularly reported historic locations in the environment 100.

At block 640, the coordination controller 140 identifies the networks 120 in the direction of travel for the station 130. In various embodiments, the identified networks 120 include networks of the same or different RAT type as the current network 120 that the station 130 is connected to, and may include neighboring networks 120 that are currently available, or that are predicted to become available within a predefined timeframe. The coordination controller 140 may identify neighboring networks 120 to the current network 120 as well as networks 120 that do not neighbor the current network 120 (but may neighbor the neighboring networks 120).

At block 650, the coordination controller 140 creates and/or modifies the neighbor list for use by the station 130. Rather than relying on the station 130 to self-identify in-range networks 120 (i.e., those networks 120 within the scan range of the hardware of the station 130) to request handoff to, the coordination controller 140 adds (per sub-block 650a) and removes (per sub-block 650b) networks 120 to or from the neighbor list to reduce superfluous handoffs, identify preferred networks for continuous service, or force a station 130 to select or avoid selecting a given network 120 to roam to from the current network 120.

In various embodiments, the coordination controller 140 may prioritize certain networks 120 that are included in the neighbor list over other networks 120. For example, the coordination controller 140 may prioritize certain networks 120 over others based on RAT type, number of currently connected stations 130 to a given network 120, downlink/uplink speed of a given network 120, whether a password or other authentication is required for access to a given network 120, whether the station 130 had previously connected to a given network 120, etc.

At block 660, the coordination controller 140 transmits the neighbor list to the station 130. Method 600 may then conclude.

Figure 7:
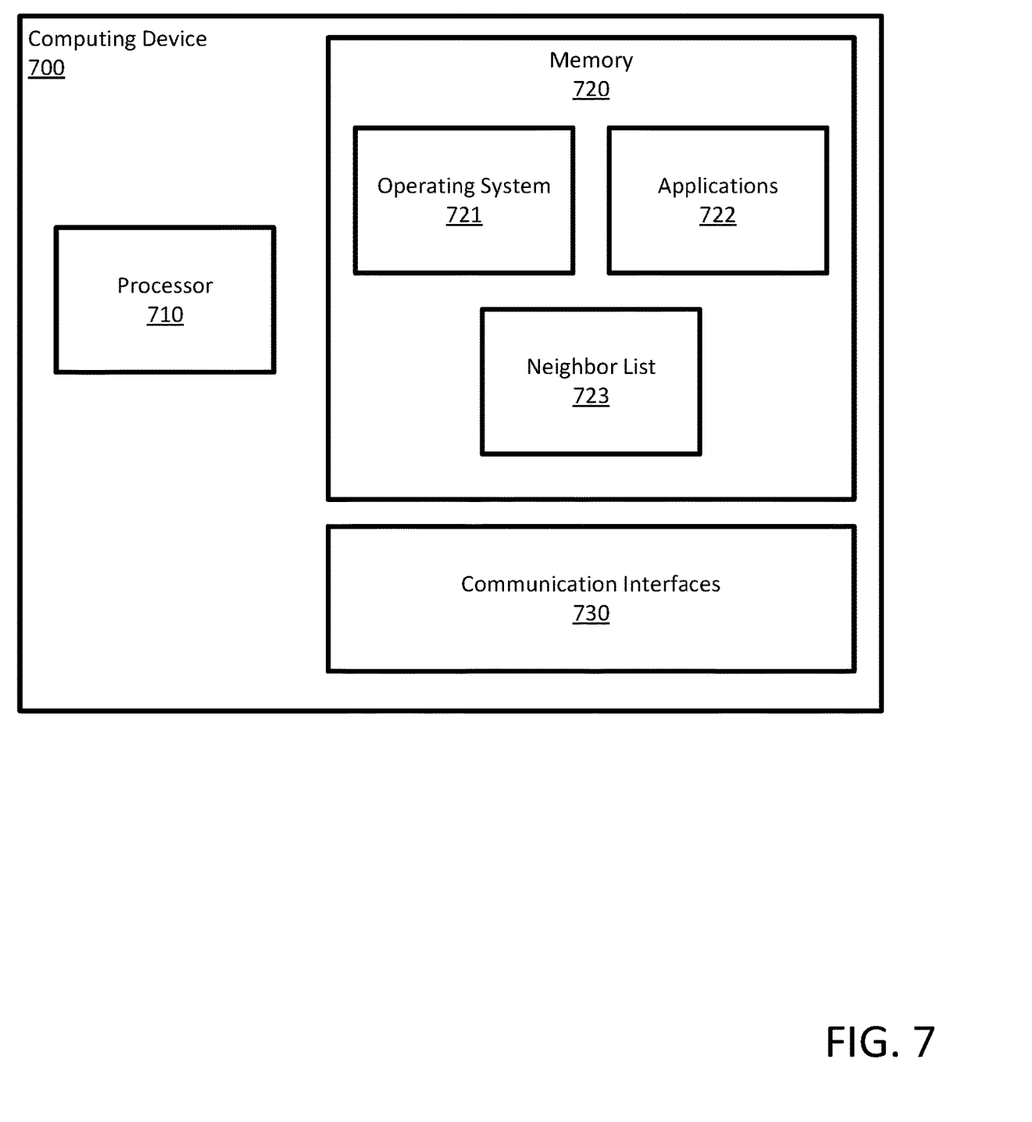
FIG. 7 illustrates hardware of a computing device, according to embodiments of the present disclosure.

FIG. 7 illustrates hardware of a computing device 700, as may be used in an AP 110, station 130, or coordination controller 140 described in the present disclosure. The computing device 700 includes a processor 710, a memory 720, and communication interfaces 730. The processor 710 may be any processing element capable of performing the functions described herein. The processor 710 represents a single processor, multiple processors, a processor with multiple cores, and combinations thereof. The communication interfaces 730 facilitate communications between the computing device 700 and other devices. The communications interfaces 730 are representative of wireless communications antennas and various wired communication ports. The memory 720 may be either volatile or non-volatile memory and may include RAM, flash, cache, disk drives, and other computer readable memory storage devices. Although shown as a single entity, the memory 720 may be divided into different memory storage elements such as RAM and one or more hard disk drives.

As shown, the memory 720 includes various instructions that are executable by the processor 710 to provide an operating system 721 to manage various functions of the computing device 700 and one or more applications 722 to provide various functionalities to users of the computing device 700, which include one or more of the functions and functionalities described in the present disclosure. Additionally, the memory 720 includes one or more neighbor lists 723 containing the identities and preferences for networks 120 to roam to, and conditions to roam to a new network 120 for a particular station 130.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   identifying a first station connected to a first wireless network in an environment;
   identifying a direction of travel of the first station;
   identifying a second wireless network and a third wireless network as candidate roaming targets, wherein both of the second wireless network and the third wireless network neighbor the first wireless network and are ahead of the first station in the direction of travel, wherein the second wireless network and the third wireless network are different from the first wireless network;
   modifying a neighbor list for the first station to include an Access Point (AP) included in the third wireless network based on environmental knowledge;
   removing APs included in the second wireless network based on the environmental knowledge; and
   transmitting the neighbor list to the first station.

2. The method of claim 1, wherein the environmental knowledge includes pathing through the environment and placement of the second wireless network and the third wireless network relative to the pathing, wherein the direction of travel is extrapolated from the pathing, and wherein the second wireless network is removed from the neighbor list based on a greater coverage area of the third network being in the direction of travel in comparison to a lower coverage area of the second network being in the direction of travel.

3. The method of claim 1, wherein the first wireless network and the second wireless network provide a first one of a Wi-Fi network and a cellular network and the third wireless network provides a second one of the Wi-Fi network and the cellular network.

4. The method of claim 3, wherein the neighbor list is modified to remove the second Access Point based on an idle status of the first station on the first one of the Wi-Fi network and the cellular network.

5. The method of claim 1, further comprising aggregating the environmental knowledge by:
   receiving signal characteristics from a plurality of stations that indicate:
      a time at which a given signal characteristic is reported;
      a location in the environment at which the given signal characteristic is reported; and
      network characteristics of wireless networks made available to a reporting station at the time and the location; and
   correlating the signal characteristics into a heatmap of network availability in the environment.

6. The method of claim 5, further comprising:
   identify transition regions between wireless networks in the environment based on the heatmap of network availability to perform station handoff, wherein the transition regions vary based on:
      a time of day;
      a day of week; and
      hardware capabilities of the first station.

7. The method of claim 1, further comprising:
   modifying the neighbor list to include a remote AP providing a fourth wireless network in the direction of travel that does not neighbor the first wireless network and is outside of a scan range of the first station.

8. A system, comprising:
   a processor; and
   a memory including instructions that when executed by the processor enable the system to perform an operation comprising:
      identifying a first station connected to a first wireless network in an environment;
      identifying a direction of travel of the first station;
      identifying a second wireless network and a third wireless network as candidate roaming targets, wherein both of the second wireless network and the third wireless network neighbor the first wireless network and are ahead of the first station in the direction of travel, wherein the second wireless network and the third wireless network are different from the first wireless network;
modifying a neighbor list for the first station to include an Access Point (AP) included in the third wireless network based on environmental knowledge;
removing APs included in the second wireless network based on the environmental knowledge; and
transmitting the neighbor list to the first station.

9. The system of claim 8, wherein the environmental knowledge includes pathing through the environment and placement of the second wireless network and the third wireless network relative to the pathing, wherein the direction of travel is extrapolated from the pathing, and wherein the second wireless network is removed from the neighbor list based on a greater coverage area of the third network being in the direction of travel in comparison to a lower coverage area of the second network being in the direction of travel.

10. The system of claim 8, wherein the first wireless network and the second wireless network provide a first one of a Wi-Fi network and a cellular network and the third wireless network provides a second one of the Wi-Fi network and the cellular network.

11. The system of claim 10, wherein the neighbor list is modified to remove the second Access Point based on an idle status of the first station on the first one of the Wi-Fi network and the cellular network.

12. The system of claim 8, wherein the operation further comprises aggregating the environmental knowledge by:
  receiving signal characteristics from a plurality of stations that indicate:
    a time at which a given signal characteristic is reported;
    a location in the environment at which the given signal characteristic is reported; and
    network characteristics of wireless networks made available to a reporting station at the time and the location; and
  correlating the signal characteristics into a heatmap of network availability in the environment.

13. The system of claim 5, wherein the operation further comprises:
  identify transition regions between wireless networks in the environment based on the heatmap of network availability to perform station handoff, wherein the transition regions vary based on:
    a time of day;
    a day of week; and
    hardware capabilities of the first station.

14. The system of claim 1, wherein the operation further comprises:
  modifying the neighbor list to include a fourth Access Point providing a fourth wireless network in the direction of travel that does not neighbor the first wireless network and is outside of a scan range of the first station.

15. A memory device including instructions that when executed by a processor enable a computing device to perform an operation comprising:
  identifying a first station connected to a first wireless network in an environment;
  identifying a direction of travel of the first station;
  identifying a second wireless network and a third wireless network as candidate roaming targets, wherein the second wireless network and the third wireless network neighbor the first wireless network and are ahead of the first station in the direction of travel, wherein the second wireless network and the third wireless network are different from the first wireless network;
  modifying a neighbor list for the first station to include an Access Point (AP) included in the third wireless network based on environmental knowledge;
  removing APs included in the second wireless network based on the environmental knowledge; and
  transmitting the neighbor list to the first station.

16. The memory device of claim 15, wherein the environmental knowledge includes pathing through the environment and placement of the second wireless network and the third wireless network relative to the pathing, wherein the direction of travel is extrapolated from the pathing, and wherein the second wireless network is removed from the neighbor list based on a greater coverage area of the third network being in the direction of travel in comparison to a lower coverage area of the second network being in the direction of travel.

17. The memory device of claim 15, wherein the first wireless network and the second wireless network provide a first one of a Wi-Fi network and a cellular network and the third wireless network provides a second one of the Wi-Fi network and the cellular network.

18. The memory device of claim 17, wherein the neighbor list is modified to remove the second Access Point based on an idle status of the first station on the first one of the Wi-Fi network and the cellular network.

19. The memory device of claim 15, wherein the operation further comprises aggregating the environmental knowledge by:
  receiving signal characteristics from a plurality of stations that indicate:
    a time at which a given signal characteristic is reported;
    a location in the environment at which the given signal characteristic is reported; and
    network characteristics of wireless networks made available to a reporting station at the time and the location; and
  correlating the signal characteristics into a heatmap of network availability in the environment.

20. The memory device of claim 15, wherein the operation further comprises:
  modifying the neighbor list to include a fourth Access Point providing a fourth wireless network in the direction of travel that does not neighbor the first wireless network and is outside of a scan range of the first station.

* * * * *